(12) United States Patent
An

(10) Patent No.: US 6,799,058 B2
(45) Date of Patent: Sep. 28, 2004

(54) APPARATUS AND METHOD FOR SWITCHING SERVICE CLASS IN RESPONSE TO GENERATED HEAT IN A GPRS TERMINAL

(75) Inventor: Seong-Hyuk An, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 478 days.

(21) Appl. No.: 09/891,990

(22) Filed: Jun. 26, 2001

(65) Prior Publication Data

US 2002/0039897 A1 Apr. 4, 2002

(30) Foreign Application Priority Data

Sep. 29, 2000 (KR) .......................................... 2000-57329

(51) Int. Cl.⁷ ................................................ H04M 1/00
(52) U.S. Cl. ...................... 455/560; 455/423; 455/61.1; 455/133; 455/217
(58) Field of Search .......................... 455/456.1, 456.2, 455/452, 433, 67.1, 115.1, 67.11, 423, 428, 439, 464, 560, 199.1, 191.3, 3.04, 154.1, 133, 217, 66.1; 370/342

(56) References Cited

U.S. PATENT DOCUMENTS

| 5,603,101 | A |   | 2/1997 | Choi |
| 5,774,784 | A |   | 6/1998 | Ohno |
| 5,930,241 | A | * | 7/1999 | Fried ........................... 370/328 |
| 6,253,063 | B1 | * | 6/2001 | Cudak et al. .............. 455/63.1 |
| 6,574,209 | B1 | * | 6/2003 | Kosaka ....................... 370/342 |
| 6,606,501 | B1 | * | 8/2003 | Saha et al. .................. 342/450 |
| 2003/0109274 | A1 | * | 6/2003 | Budka et al. ............... 455/522 |
| 2004/0017796 | A1 | * | 1/2004 | Lemieux et al. ............ 370/349 |

FOREIGN PATENT DOCUMENTS

| WO | WO 00/01094 | 1/2000 |
| WO | WO 00/31990 | 6/2000 |
| WO | WO 00/31990 A2 | 6/2000 |

OTHER PUBLICATIONS

Chinese Patent Office First Office Action dated Jun. 20, 2003 issued in Appln. No. 01133977.2.
European Search Report dated May 12, 2003, issued in a counterpart application, namely, Appln. No. 01119273.9.

* cited by examiner

Primary Examiner—Cong Van Tran
Assistant Examiner—Kiet Le
(74) Attorney, Agent, or Firm—Dilworth & Barrese, LLP

(57) ABSTRACT

An apparatus and method for switching a GPRS (General Packet Radio Service) service class according to the heat generated by at least one specific element in a GPRS terminal during a GPRS mode of operation. A temperature sensor measures a temperature of a specific element in the GPRS terminal during a GPRS mode of operation. An A/D converter converts an analog value of the temperature measured by the temperature sensor to a digital value. A limit data register stores a critical temperature of the specific element for the GPRS service class. A controller compares the measured temperature from the temperature sensor with the critical temperature stored in the limit data register, and switches the GPRS service class to a low class, when the measured temperature is greater than or equal to the critical temperature. The controller maintains the present GPRS service class when the measured temperature is less than the critical temperature. Further, the controller switches the GPRS service class from the low class to the high class, when the measured temperature becomes less than the critical temperature during the low class GPRS service.

7 Claims, 3 Drawing Sheets

APPARATUS AND METHOD FOR SWITCHING SERVICE CLASS IN RESPONSE TO GENERATED HEAT IN A GPRS TERMINAL

PRIORITY

This application claims priority to an application entitled "Apparatus and Method for Switching Service Class According to Generated Heat in a GPRS Terminal" filed in the Korean Industrial Property Office on Sep. 29, 2000 and assigned Serial No. 2000-57329, the contents of which are hereby incorporated by reference.

BACKGROUND OF THE INVENTION

1. Field of the Invention

The present invention relates generally to a GPRS (General Packet Radio Service) system, and in particular, to an apparatus and method for switching a service class according to the heat generated by a specific element in a GPRS terminal.

2. Description of the Related Art

In general, "GPRS" refers to a radio packet data service provided in a European-style GSM (Global System for Mobile communication) system, and corresponds to the HDR (High Data Rate) technique developed by Qualcomm, USA. The GPRS system increases a data rate per GSM channel from 9600 bps (bits per second) to 14400 bps by performing packet switching in a GSM network, and can support high-speed packet switching of up to 14.4–115 Kbps in the existing GSM network environment through a data compression technique. That is, the GPRS system, facilitating the expansion of a data network to the mobile communication network, provides a GSM packet data service, manages packet mobility and billing processes using GSM network equipment such as HLR (Home Location Register) and VLR (Visitor Location Register), and also provides paging and SMS (Short Message Service) services to the voice service.

In a GPRS terminal, a GPRS service class is classified into 12 service classes according to the duration of the time slots as occupied per frame. That is, the GPRS terminal can occupy a maximum of 5 time slots per frame, including time slots for transmission (TX) and time slots for reception (RX). An increase in the number of the occupied time slots causes an increase in the entire duration of the occupied time slots, thus enabling the GPRS terminal to transmit and receive an increased amount of data. The 12 service classes are again classified into first and second classes, such as a high class and a low class according to relative duration of the time slots.

When the GSM GPRS terminal supporting high-speed data communication is provided with the high-class GPRS service where transmission power is set high and the duration of the time slots is set long, specific elements such as a power supply IC (Integrated Circuit), a power amplifier module and a processor are subject to heat generation due to the increased duration of the time slots, thereby causing deterioration of the QoS (Quality of Service) and damage to the elements in the RF transceiver. In the prior art, switching between service classes is not readily available to alleviate the heat generation problem.

SUMMARY OF THE INVENTION

It is, therefore, an object of the present invention to provide an apparatus and method for switching a GPRS service class in response to the heat generated by specific elements in a GPRS terminal during a GPRS mode of operation.

To achieve the above and other objects, there is provided an apparatus for switching a GPRS service class in a GPRS terminal. A temperature sensor measures a temperature of at least one specific element in the GPRS terminal during a GPRS mode of operation. An analog-to-digital (A/D) converter converts an analog value of the temperature measured by the temperature sensor to a digital value. A limit data register stores a critical temperature of the specific element for the GPRS service class. A controller compares the measured temperature from the temperature sensor with the critical temperature stored in the limit data register, and switches the GPRS service class to a low class, when the measured temperature is greater than or equal to the critical temperature. The controller maintains the present GPRS service class when the measured temperature is less than the critical temperature. Further, the controller switches the GPRS service class from the low class back to the high class, when the measured temperature becomes less than the critical temperature during the low-class GPRS service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
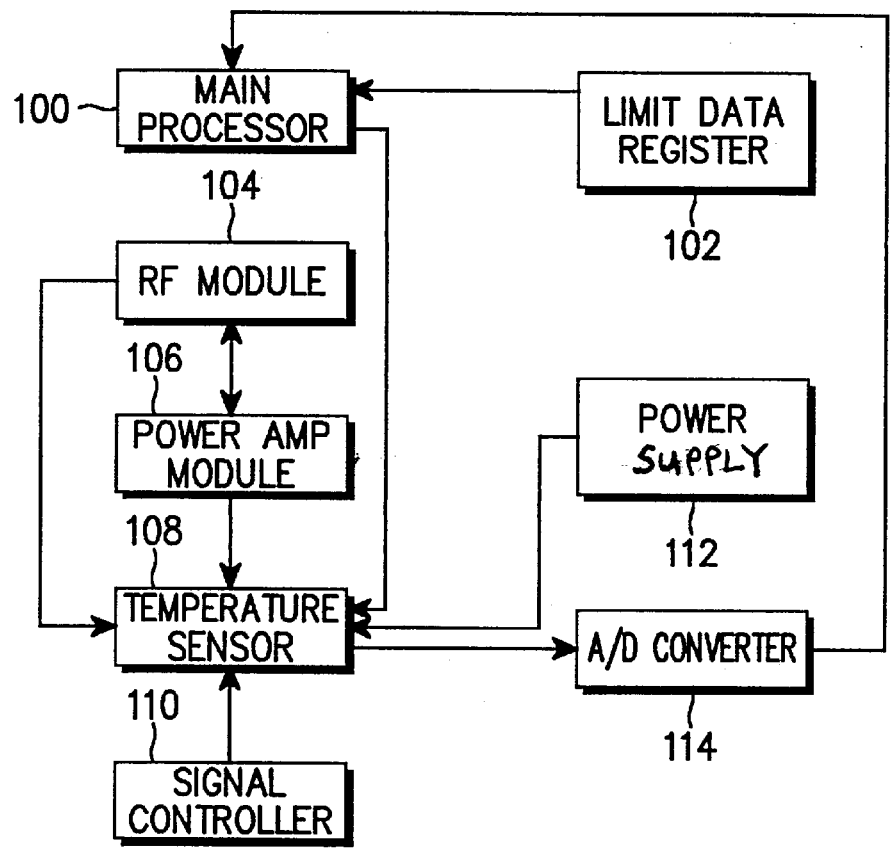
FIG. 1 is a block diagram illustrating a GPRS terminal according to an embodiment of the present invention.

FIG. 1 illustrates a block diagram of an RF transceiver in a GPRS terminal according to an embodiment of the present invention.

Referring to FIG. 1, a main processor 100 controls the overall operation of the GPRS terminal. Specifically, a temperature sensor 108 provides the main processor 100 with information about the heat generated in a GPRS mode by at least one of a main processor 100, an RF module 104, a power amplifier module 106, signal controller 110 and a power supply 112. The main processor 100 then compares the temperature information of the elements provided from the temperature sensor 108 with a critical temperature for each element previously stored in a limit data register 102, and switches the GPRS service class from a high class to a low class, if the temperature of an element is greater than or equal to its respective critical temperature. After that, if the temperature of the at least one element becomes less than the critical temperature, the main processor 100 switches the GPRS service class of the terminal back to the high class. The temperature sensor 108 measures the temperature of the main processor 100, the RF module 104, the power amplifier module 106, signal controller 110, and the power supply IC 112 during the GPRS mode of operation. This list is not meant to be inclusive as any of the elements of the terminal can be monitored by the temperature sensor 108, and their respective critical temperatures stored in limit data register 102. An A/D (Analog-to-Digital) converter 114 converts an analog value of the temperature measured by the temperature sensor 108 to a digital temperature value, and provides the converted digital temperature value to the main processor 100. The limit data register 102 can store the various critical temperatures, based on which GPRS service class the terminal is to be switched to. The "critical temperature" refers to a boundary temperature or threshold so defined as to prevent a QoS deterioration and element damage of the terminal due to the heat generated because of the increase in duration of the time slots during the GPRS mode of operation.

Figure 2:
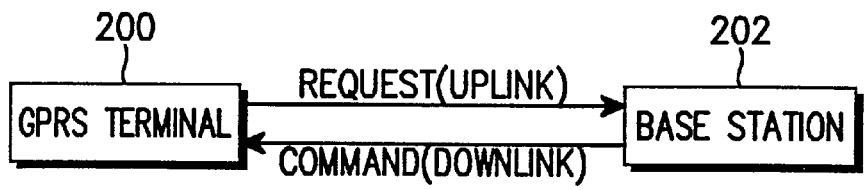
FIG. 2 is a block diagram illustrating the connection between the GPRS terminal according to the present invention and a base station.

FIG. 2 illustrates the connection between a GPRS terminal according to the present invention and a base station. A GPRS terminal 200 sends to a base station 202 through an uplink a request for switching the service class to the low class when it is necessary to switch the GPRS service class to the low class because the temperature of one of the specific elements is greater than or equal to the critical temperature during the GPRS mode. In response to the service class switch request, the base station 202 sends a service class-down switch command to the GPRS terminal 200 through a downlink. Upon receipt of the service class-down switch command from the base station 202, the GPRS terminal 200 switches the GPRS service class to the low class. Thereafter, if the temperature of the specific element drops below its respective critical temperature during the low class GPRS service, the GPRS terminal 200 switches the GPRS service class back to the high class in a similar process, to thereby re-enable the high-speed data communication.

Figure 3A:
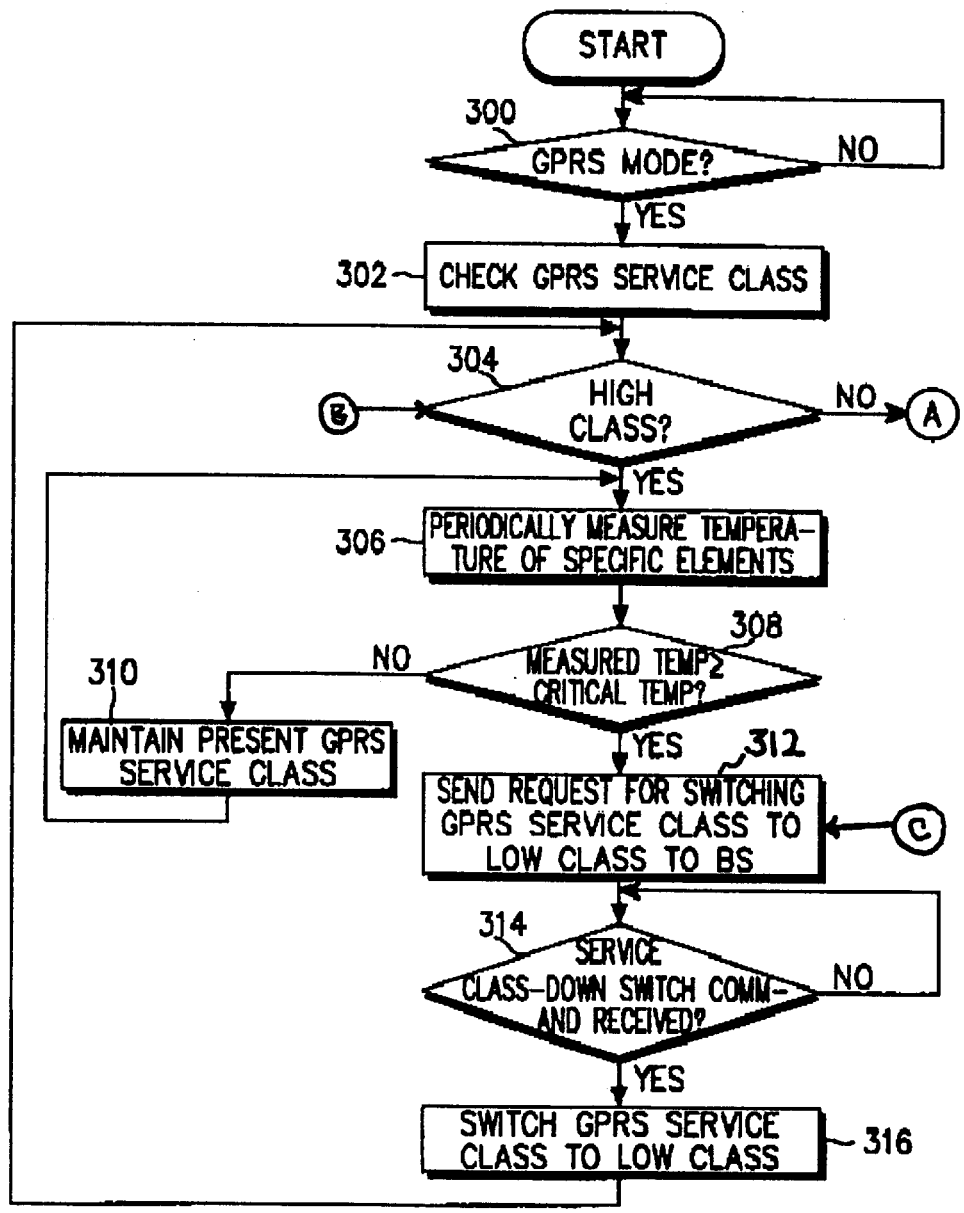
FIGS. 3A and 3B are flow charts illustrating a procedure for switching a GPRS service class in response to the heat generated during a GPRS mode of operation.
Figure 3B:
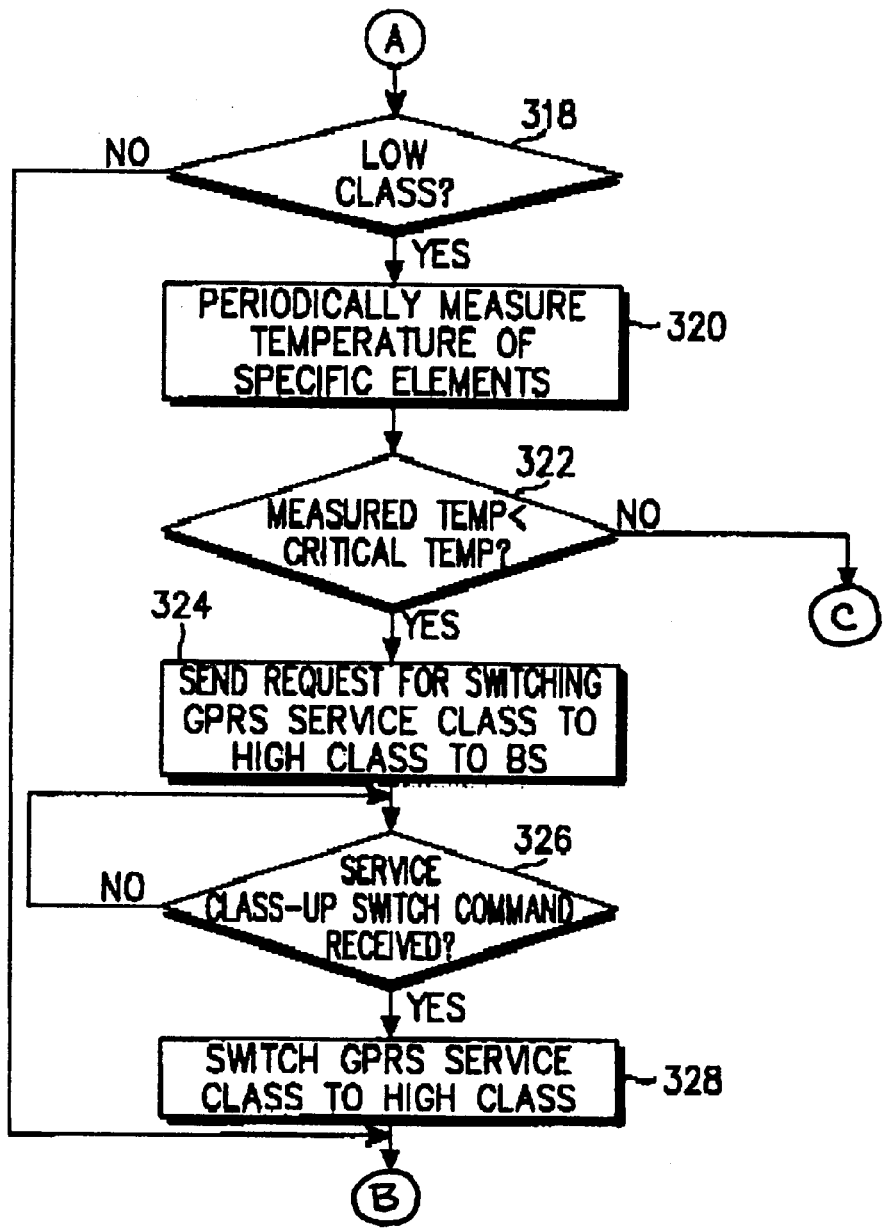

FIGS. 3A and 3B illustrate a procedure for switching a GPRS service class according to the heat generated by specific elements in the GPRS terminal according to an embodiment of the present invention. Now, a detailed description of the present invention will be made with reference to FIGS. 1 to 3B.

A user of the GPRS terminal will set an operation mode of the terminal to the GPRS mode when he or she desires to perform a high-speed data communication. The main processor 100 then determines in step 300 whether a GPRS mode setting request is received from the user. Upon receipt of the GPRS mode setting request, the main processor 100 sets the terminal to the GPRS mode. After setting the GPRS mode, the main processor 100 checks the GPRS service class presently set in the terminal, in step 302.

The main processor 100 then determines in step 304 whether the present GPRS service class is the high class. If the present GPRS service class is the high class, the main processor 100 performs the GPRS high-speed data communication and at the same time, receives temperature information of the specific elements in the terminal from the temperature sensor 108, in step 306. The main processor 100 determines in step 308 whether the measured temperature is greater than or equal to the critical temperature previously stored in the limit data register 102. If the measured temperature is less than the critical temperature, the main processor 100 maintains the present high class GPRS service in step 310, and the process returns to step 306. Otherwise, if the measured temperature is greater than or equal to the critical temperature in step 308 so that it is necessary to switch the GPRS service class to the low class, the main processor 100 sends a request for switching the service class to the low class to the base station 202 through the uplink in step 312. The main processor 100 determines in step 314 whether a service class-down switch command is received from the base station 202 through the downlink in response to the service class switch request. Upon receipt of the service class-down switch command from the base station 202, the main processor 100 switches the GPRS service class to the low class in step 316.

Otherwise, if the GPRS service class is not set to the high class in step 304, the main processor 100 determines in step 318 of FIG. 3B whether the GPRS service class is set to the low class. If the GPRS service class is set to the low class, the main processor 100 receives the temperature information of the specific elements in the GPRS terminal from the temperature sensor 108, in step 320. The main processor 100 determines in step 322 whether the measured temperature is less than the critical temperature. If the measured temperature is less than the critical temperature so that it is necessary to switch the service class to the high class, the main processor 100 sends a request for switching the service class to the high class to the base station 202 through the uplink in step 324. The main processor 100 determines in step 326 whether a service class-up switch command is received from the base station 202 through the downlink in response to the service class switch request. Upon receipt of the service class-up switch command from the base station 202, the main processor 100 switches the GPRS service class to the high class in step 328, enabling the high-speed data communication. The process then returns to step 304.

As described above, the novel service class switching apparatus and method according to the present invention periodically measures the temperature of specific elements in the GPRS terminal during the GPRS mode of operation, and switches the GPRS service class to the low class having short-duration time slots when the measured temperature is greater than or equal to a predetermined critical temperature. Thereafter, if the measured temperature becomes less than the critical temperature, the GPRS terminal switches the GPRS service class back to the high class, to thereby re-enable the high-speed data communication. By doing so, the novel service class switching apparatus and method can prevent QoS deterioration and damage to the elements due to excessive heat generated during high class service operations.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for switching a GPRS (General Packet Radio Service) service class in a GPRS terminal, comprising:
    a temperature sensor for measuring a temperature of at least one specific element in the GPRS terminal during a GPRS mode of operation;
    a limit data register for storing a critical temperature of the at least one specific element for the GPRS service class; and
    a controller for comparing the measured temperature from the temperature sensor with the critical temperature stored in the limit data register, and switching the GPRS service class from a first class to a second class when the measured temperature is greater than or equal to the critical temperature.

2. The apparatus as claimed in claim 1, wherein the controller maintains the present GPRS service class when the measured temperature is less than the critical temperature.

3. The apparatus as claimed in claim 1, wherein the controller switches the GPRS service class from the first class back to the second class when the measured temperature becomes less than the critical temperature during the second class GPRS service.

4. The apparatus as claimed in claim 1, further comprising an analog-to-digital (A/D) converter for converting an analog value of the temperature measured by the temperature sensor to a digital value.

5. A method for switching a GPRS (General Packet Radio Service) service class according to generated heat in a GPRS terminal, comprising the steps of:

measuring a temperature of at least one specific element in the GPRS terminal during a GPRS mode of operation;

determining to switch the GPRS service class from a first class to a second class when the measured temperature is greater than or equal to a critical temperature;

sending a request for switching the GPRS service class to the second class to a base station through an uplink; and upon receipt of a service class-down switch command from the base station through a downlink in response to the GPRS service class switch request, switching the GPRS service class to the second class.

6. The method as claimed in claim 5, further comprising the step of maintaining the present GPRS service class when the measured temperature is less than the critical temperature.

7. The method as claimed in claim 5, further comprising the steps of:

determining to switch the GPRS service class back to the first class when the measured temperature becomes less than the critical temperature during the second class GPRS service;

sending a request for switching the GPRS service class to the first class to the base station through the uplink; and upon receipt of a service class-up switch command from the base station through a downlink in response to the GPRS service class switch request, switching the GPRS service class to the first class.

\* \* \* \* \*